United States Patent [19]

Bessho

[11] Patent Number: 4,734,813
[45] Date of Patent: Mar. 29, 1988

[54] CLAMPER HOLDING MECHANISM FOR POSITIONING AN INFORMATION RECORDING DISK

[75] Inventor: Akira Bessho, Saitama, Japan

[73] Assignee: Pioneer Electronic Corporation, Tokyo, Japan

[21] Appl. No.: 727,436

[22] Filed: Apr. 26, 1985

[30] Foreign Application Priority Data

Apr. 30, 1984 [JP] Japan .................. 59-63747[U]

[51] Int. Cl.$^4$ ............................. G11B 23/03
[52] U.S. Cl. ........................... 360/133; 360/99; 360/105; 369/75.2
[58] Field of Search ................ 360/97–99, 360/133–135, 96.5; 369/282, 290, 75.2; 346/137; 206/312

[56] References Cited

U.S. PATENT DOCUMENTS

| | | | |
|---|---|---|---|
| 3,695,741 | 10/1972 | Dollenmayer | 369/75.2 |
| 4,340,052 | 7/1982 | Ikedo | 369/75.2 |
| 4,416,003 | 11/1983 | Suzuki | 369/75.2 |
| 4,570,194 | 2/1986 | Schatteman | 360/133 |
| 4,604,666 | 8/2986 | Kitahura et al. | 360/133 |

FOREIGN PATENT DOCUMENTS

| | | | |
|---|---|---|---|
| 3513039 | 10/1985 | Fed. Rep. of Germany | 369/72.2 |
| 56-58168 | 5/1981 | Japan | 369/75.2 |
| 59-36057 | 3/1984 | Japan | 360/137 |

OTHER PUBLICATIONS

IBM Technical Disclosure Bulletin, vol. 27, No. 1B, Jun. 1984, Bareman et al., "Automatic Feed Cartridge Pick-Up Mech., pp. 473–474.

Primary Examiner—John H. Wolff
Assistant Examiner—Alfonso Garcia
Attorney, Agent, or Firm—Finnegan, Henderson, Farabow, Garrett and Dunner

[57] ABSTRACT

A clamper holding mechanism for moving a clamper and a disk into, and out of, engagement with a spindle of an information disk recording and reproducing device, including a clamper positioning mechanism movable between a first position disengaged from the clamper and the disk and a second position engaged with the clamper and the disk to move the clamper and the disk away from the spindle.

5 Claims, 6 Drawing Figures

CLAMPER HOLDING MECHANISM FOR POSITIONING AN INFORMATION RECORDING DISK

FIELD OF THE INVENTION

The present invention relates to a clamper holding mechanism for positioning an information recording disk to a spindle of a disk drive.

BACKGROUND OF THE INVENTION

FIG. 1A is a cross section of an existing clamping device for an information recording disk indicating the condition before clamping. FIG. 1B is a cross section indicating the condition after clamping. In both FIG. 1A and FIG. 1B, a magnet clamper 1 (hereinafter referred to as clamper) has a collar 1a that is inserted in a hole 2a of a plate 2 and is movable in the direction of the arrow A1.

A tapered wheel 3 is arranged to oppose the clamper 1. The tapered wheel 3 is mounted to a spindle shaft 4.

The spindle shaft 4 is provided with a support wheel 5. A disk 6 is supported by the support wheel 5.

Before the unclamped condition shown in FIG. 1A changes to the clamped condition shown in FIG. 1B, the clamper 1 is supported by, and suspended from, the plate 2 that engages the collar 1a. When the plate 2 moves downward to the disk clamping condition, the clamper 1 also moves until the disk 6 is held by the clamper 1 and the support wheel 5. Moreover, the plate 2 moves downward to the condition shown in FIG. 1B. As a result, the plate 2 is separated from the rotating part and the disk 6 can be freely rotated.

To release the disk from the clamped position, the plate 2 moves upward, hooking the flange 1a at the upper part of the clamper 1 until the condition shown in FIG. 1A is regained.

In an attempt to prevent vibration when a disk is to be used in a car stereo, a mechanism part, including the spindle 4 is often floated from another mechanism by an insulator, etc. In this case, in the condition shown in FIG. 1B, when the vibration amplitude is large, the clamper 1 may collide with the plate 2 to cause a situation where there is no clearance 2b between the rotating part including the clamper 1 and the hole 2a.

To avoid this, a large clearance is required and in such a case, the clamper 1 must move a long distance in the hole 2a of the plate 2 to return to the condition shown in FIG. 1A. During the movement, the center of the clamper 1 can deviate from the position of the spindle shaft 4 to disable clamping.

OBJECTS AND SUMMARY OF THE INVENTION

An object of the present invention is to provide an improved clamper holding mechanism for an information recording disk.

Another object of the present invention is to provide a clamper holding mechanism that accurately clamps a recording disk.

A further object of the present invention is to provide a clamper holding mechanism that assures a large clearance between a clamper and a support plate when a recording disk is clamped in the playback position.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a clamper holding mechanism for clamping an information recording disk to a spindle of a disk drive mechanism including a magnetic clamper, a flange on the magnetic clamper, a plate having a central aperture for receiving the clamper, clamper positioning means movable between a first position (clamping) wherein the clamper positioning means is disengaged from the clamper and the disk to enable the clamper to clamp the disk to the spindle and a second position (unclamping) wherein the clamper positioning means engages the clamper and the disk to enable the clamper and the disk to be removed from the spindle, and means for moving the clamper positioning means between the first and second positions.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 2A:
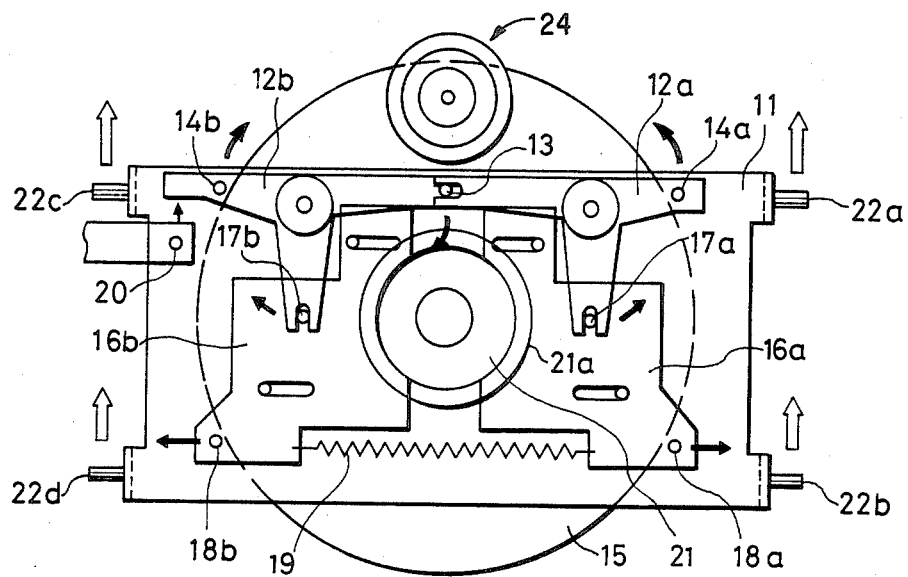
FIG. 2A is a plan view of an embodiment of a clamper holding mechanism for an information recording disk according to the present invention.
Figure 2B:
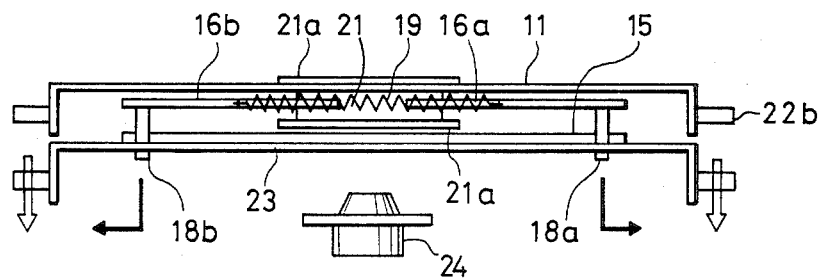
FIG. 2B is a front elevated view of the mechanism of FIG. 2A.

FIG. 2A is a plan view of an embodiment of the present invention. FIG. 2B is a front elevation thereof. In the FIG. 2A and FIG. 2B, a U-shaped plate 11 faces downward. A pair of arms 12a, 12b are provided on the upper surface of the plate 11 for rotation about respective hold pins 14a, 14b. The right and left arms 12a and 12b are coupled by a pin 13. The hold pins 14a, 14b are used for holding the disk 15.

A pair of levers 16a, 16b are slidably mounted under the plate 11 in the direction indicated by the black arrows. These levers 16a, 16b are respectively coupled to the arms 12a, 12b by pins 17a, 17b. The levers 16a, 16b respectively support hold pins 18a, 18b used for clamping the disk 15. A spring 19 is provided between the levers 16a and 16b. The lever 16b is driven by the arm drive pin 20 through the arm 12b.

A hole is formed at the center of the plate 11 and a magnetic clamper 21 is inserted into this hole for positioning. The clamper 21 is always held in the same position by the clamper holding mechanism, which includes the levers 16a, 16b, the spring 19 and the arms 12a, 12b. In particular, each of the levers 16a and 16b have a clamper engaging surface for moving in and out of contact with the clamper 21.

A collar 21a is provided at the upper and lower surfaces of the clamper 21. When the disk 15 is clamped, the collar 21a separates the plate 11 and the clamper 21. Clamping is released by hooking the collar 21a with the plate 11.

Four plate pins 22a-22d are formed in the areas near the four corners of the plate 11. A tray 23 and a spindle 24 are also provided.

The operation of the clamper holding mechanism for an information recording disk according to the present invention will be explained below. First, in FIG. 2A, the disk 15 is held by the front hold pins 18a, 18b and the rear hold pins 14a, 14b and the spring 19. Moreover, the clamper 21 is held coaxially with the disk 15 by the force of the spring 19 through the levers 16a, 16b.

From this condition, the plate 11 is driven in the direction indicated by the white arrow in FIG. 2A. When the center of the disk 15 and the clamper 21 come to the area just above the spindle 24, the plate 11 is driven downward as shown by the white arrow in FIG. 2B.

In this case, when the arm drive pin 20 pushes the arm 12b to the left, each member on the plate 11, namely the arms 12a, 12b and the levers 16a, 16b are respectively driven in the direction indicated by the black arrows shown in FIG. 2A.

As a result, the front hold pins 18a, 18b and the rear hold pins 14a, 14b are separated from the disk 15, and the levers 16a, 16b are also separated from the clamper 21. Under this condition, the clamping of the disk 15 is terminated and the disk 15 and the clamper 21 can be rotated.

Figure 3A:
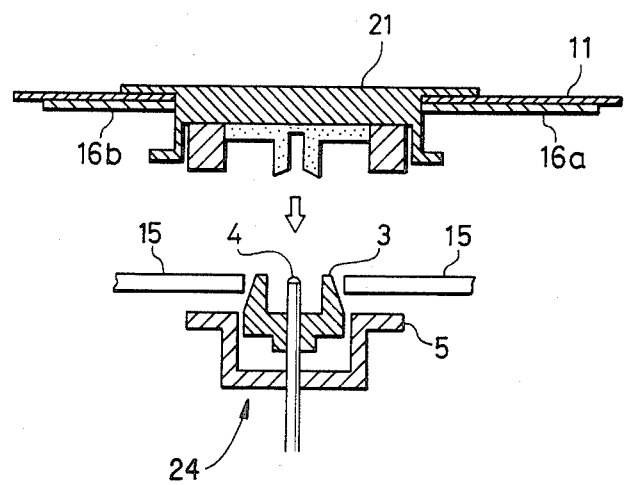
FIG. 3A is a cross sectional view of the periphery of the mechanism of FIG. 2A shown in a position before clamping.
Figure 3B:
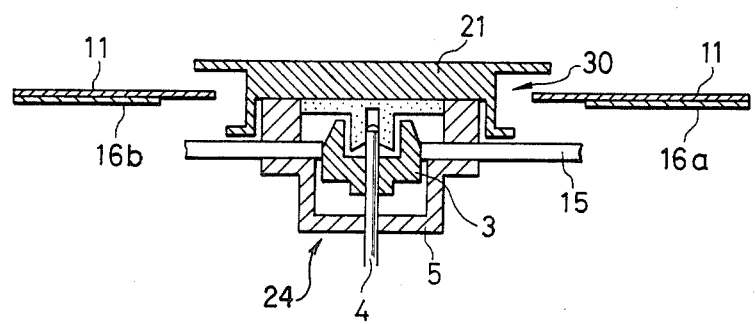
FIG. 3B is a cross sectional view of the periphery of the mechanism of FIG. 2A shown in a position after clamping.

FIGS. 3A and 3B respectively show cross sections along the center of the clamper 21 in order to indicate operation around the clamper 21. FIG. 3A shows the condition before clamping, while FIG. 3B shows the condition after clamping.

Figure 1A:
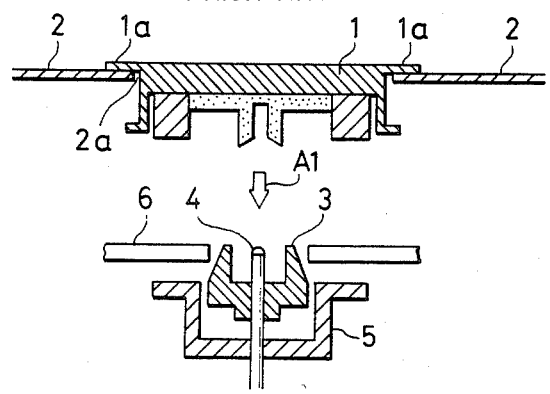
FIG. 1A is a cross sectional view of a conventional clamper holding mechanism for an information recording disk shown in a position before clamping.
Figure 1B:
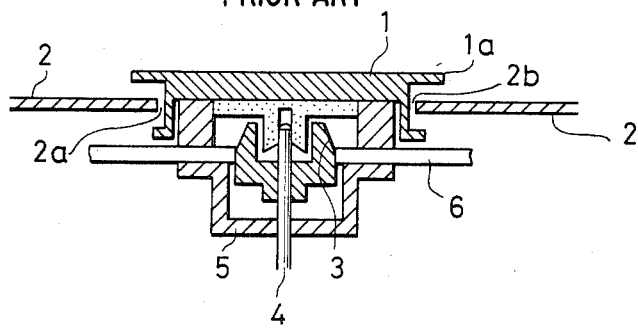
FIG. 1B is a cross sectional view of the clamper holding mechanism of FIG. 1A shown in a position after clamping.

In FIGS. 3A and 3B, like parts as those in FIGS. 2A and 2B are designated by like reference numerals. Moreover in the present invention the tapered wheel 3, spindle shaft 4 and support wheel 5 comprising the spindle 24 are designated by like reference numerals as those used in FIGS. 1A and 1B.

In FIG. 3A, the clamper 21 is held at the center by the levers 16a, 16b, but as shown in FIG. 3B, since the levers 16a, 16b are separated from the clamper 21 during clamping, the rotating part is separated by a large clearance 30 from the stationary part.

In FIG. 3A, the clamper 21 is separated from the support wheel 5 by the plate 11 and then it is lifted. In addition, the levers 16a, 16b hold the clamper 21 at the center position.

In the above embodiment, the clamper 21 and the disk 15 are held by the same mechanism, but the disk 15 may be held by another mechanism and the clamper 21 may also be held by parts other than the levers 16a, 16b. Moreover, clamping may be cancelled and the clamper 21 may also be lifted and held by only the lever.

Other embodiments of the invention will be apparent to those skilled in the art from consideration of the specification and practice of the invention disclosed herein. it is intended that the specification and examples be considered as exemplary only, with a true scope and spirit of the invention being indicated by the following claims.

What is claimed is:

1. A clamper holding mechanism for positioning an information recording disk, comprising:

a spindle having a surface for supporting the disk, an assembly including a tray for receiving the disk and a plate having a central opening mounted above and spaced apart from the tray, a magnetic clamper movably disposed in the central opening, said clamper having flange portions for limiting the movement therein, positioning means including primary lever means each having a surface opposing the magnetic clamper for engaging selectively magnetic clamper, said positioning means including a plurality of spaced projections for engaging selectively the disk at the outer perimeter thereof for engaging and transporting the disk in the tray, said positioning means being movable to a first position for positioning the opposing surfaces of the primary lever means to engage the clamper and for positioning the plurality of spaced projections to engage the edge of the disk, said positioning means being movable to a second position for positioning the opposing surfaces of the lever means and the projections to release the clamper and the disk, respectively, said assembly being movable in a first direction when the positioning means are in said first position for positioning the disk in registry with the spindle, said assembly being movable in a second direction when the positioning means are moving from said first position to said second position for releasing the magnetic clamper for magnetically clamping the disk between the clamper and the supporting surface of the spindle, said clamper being rotatable with the spindle.

2. The clamper holding mechanism of claim 1, wherein said primary lever means comprises a first and second lever, and said clamper holding mechanism further comprises secondary lever means including a third and fourth lever for movably engaging the first and second lever, respectively.

3. The clamper holding mechanism of claim 1, wherein each of said projections are mounted on a respective one of said levers.

4. The clamper holding mechanism of claim 2, wherein said positioning means further comprises a spring having a first end connected to said first lever and a second end connected to said second lever for biasing said first and second levers to said first position.

5. The clamper holding mechanism of claim 3, wherein said projections include disk engaging pins extending from each of said levers in a direction perpendicular to the plane of the disk.

* * * * *